(12) United States Patent
Chen et al.

(10) Patent No.: US 11,227,272 B1
(45) Date of Patent: Jan. 18, 2022

(54) BUSINESS METHOD OF PROVIDING TRADE AND DATA AND ANALYZING SUGGESTION TO PRODUCT AND SERVICE PLATFORM

(71) Applicant: EZ Platform, Upland, CA (US)

(72) Inventors: Wen-Hsin Chen, New Taipei (TW); Jack Tseng, New Taipei (TW); Hai-Wei Lin, New Taipei (TW)

(73) Assignee: EZ PLATFORM, Upland, CA (US)

( * ) Notice: Subject to any disclaimer, the term of this patent is extended or adjusted under 35 U.S.C. 154(b) by 0 days.

(21) Appl. No.: 16/997,462

(22) Filed: Aug. 19, 2020

(51) Int. Cl.
| | |
|---|---|
| *G06Q 20/18* | (2012.01) |
| *G06Q 30/02* | (2012.01) |
| *G06Q 20/02* | (2012.01) |

(52) U.S. Cl.
CPC ............. *G06Q 20/18* (2013.01); *G06Q 20/02* (2013.01); *G06Q 30/0201* (2013.01)

(58) Field of Classification Search
None
See application file for complete search history.

(56) References Cited

U.S. PATENT DOCUMENTS

| | | | | |
|---|---|---|---|---|
| 6,230,150 B1 * | 5/2001 | Walker | ................ | G06Q 10/087 700/231 |
| 6,324,520 B1 * | 11/2001 | Walker | ................ | G06Q 10/087 700/231 |
| 6,457,038 B1 * | 9/2002 | Defosse | ................ | G07F 9/026 709/200 |
| 7,072,855 B1 * | 7/2006 | Godlewski | ........... | G06Q 10/087 700/216 |
| 7,110,954 B2 * | 9/2006 | Yung | ................... | G06Q 10/087 705/26.1 |

\* cited by examiner

*Primary Examiner* — Kristy A Haupt
(74) *Attorney, Agent, or Firm* — Guice Patents PLLC

(57) ABSTRACT

A business method of providing trade and data and analyzing suggestion to product and service platform includes following steps: a step of providing at least one vending machine, wherein a cash flow for a payment is processed by a consumer via the vending machine, and the vending machine provides a logistic flow of supplying product to the buyer; a step of listing at least one supplier; a step of establishing at least one payment mode means; a step of establishing at least one platform; and a step of establishing at least one data analysis; accordingly, the buyer and the supplier can both be provided with the product and the purchase payment in a safe means, the supplier can be prevented from wasting the product via a product data analysis or suggestion, so that the platform and the supplier can both have benefits and share the financial gains.

4 Claims, 1 Drawing Sheet

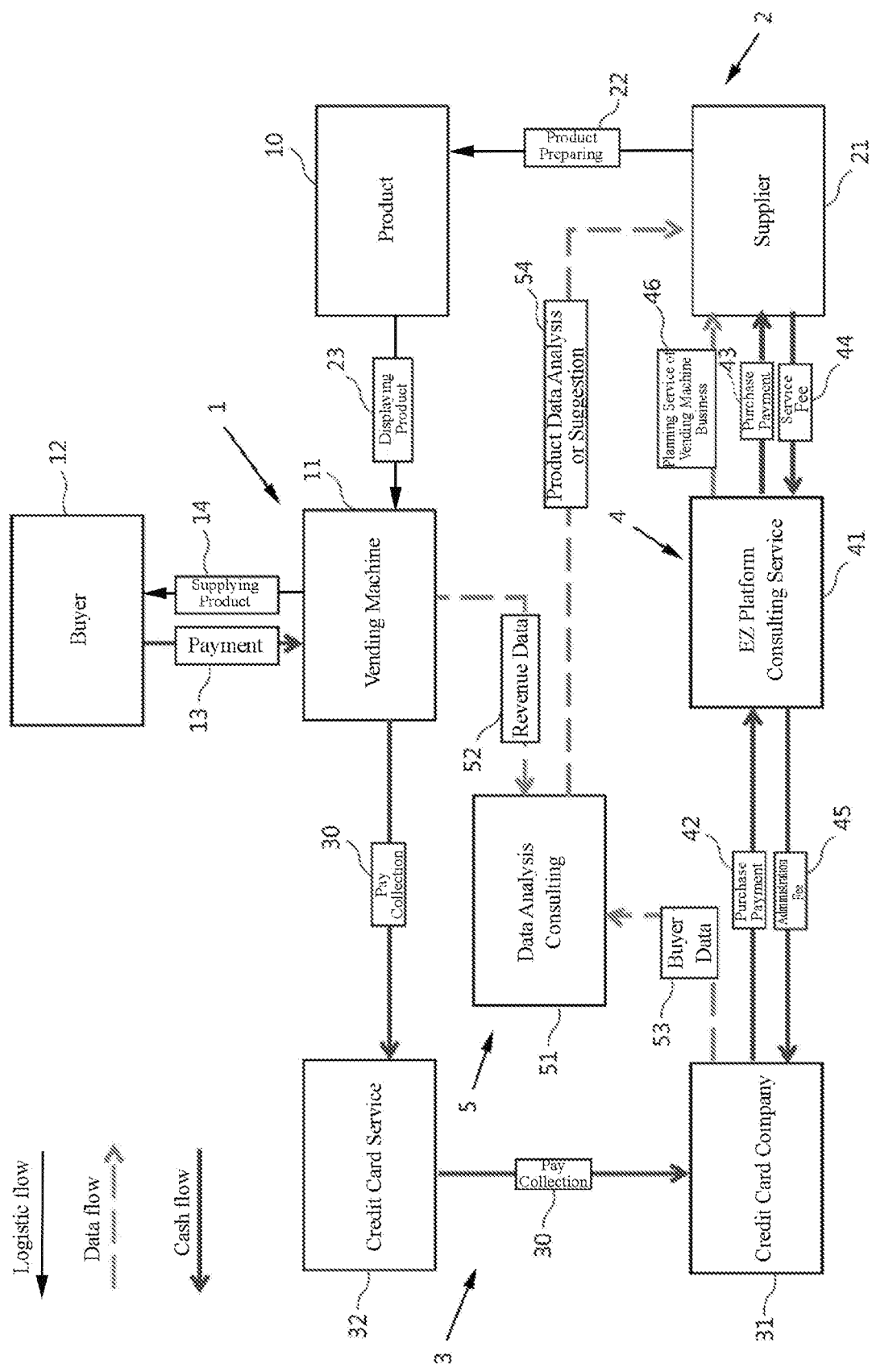

BUSINESS METHOD OF PROVIDING TRADE AND DATA AND ANALYZING SUGGESTION TO PRODUCT AND SERVICE PLATFORM

BACKGROUND OF THE INVENTION

1. Field of the Invention

The present invention relates to a business method, especially to a business method of providing trade and data and analyzing suggestion to product and service platform.

2. Description of Related Art

In a closed location such as a business building, a hospital or a factory, a vending machine is often provided for allowing a consumer to easily buy his/her desired product, and the consumer can only use coins for a unidirectional financial trade, because the vending machine is unable to be connected to any platform provided by a supplier, a payment platform or unable to be provided with any consulting service provided by the supplier, the supplier cannot obtain the feedbacks from a data analysis in multiple perspectives which can be used as references, so that situations of the supply and demand not being balanced or the material of product not being able to be timely replenished or even lacking may happen because the supplier cannot have the information for example, the certain time, the certain season, the certain weather to prepare or reduce the material of product in advance, or plan a promotion or sale, thus the products may be overly stocked and unnecessary wastes due to the product being expired is caused. Accordingly, the conventional art is very much limited in actual practicability, and the above-mentioned disadvantages shall be improved by the skilled people in the art.

SUMMARY OF THE INVENTION

For solving the above-mentioned disadvantages, one primary objective of the present invention provides a business method of providing trade and data and analyzing suggestion to product and service platform, in which a step of providing at least one vending machine; a step of listing at least one supplier; a step of establishing at least one payment mode means; a step of establishing at least one platform; and a step of establishing at least one data analysis are provided for solving the above-mentioned disadvantages.

Another objective of the present invention is to provide a business method of providing trade and data and analyzing suggestion to product and service platform, which has advantages as follows: a buyer and a supplier can both be provided with a product and a purchase payment in a safe means, the supplier can be prevented from wasting the product and can achieve the balance of the supply and demand and the financial status via a product data analysis or suggestion, so that a platform and the supplier can both have benefits and share the financial gains.

One another objective of the present invention is to provide a business method of providing trade and data and analyzing suggestion to product and service platform, which has advantages as follows: the conveniences, the accuracy and the safe trading between a supplier and a buyer can be effectively increased.

Problems to be solved by the present invention are as follows: a vending machine is often provided for allowing a consumer to easily buy his/her desired product, and the consumer can only use coins for a unidirectional financial trade, because the vending machine is unable to be connected to any platform provided by a supplier, a payment platform or unable to be provided with any consulting service provided by the supplier, the supplier cannot obtain the feedbacks from a data analysis in multiple perspectives which can be used as references, so that situations of the supply and demand not being balanced or the material of product not being able to be timely replenished or even lacking may happen, thus the products may be overly stocked and unnecessary wastes due to the product being expired is caused. Accordingly, the conventional art is very much limited in actual practicability.

For achieving the above-mentioned objectives, one technical solution provided by the present invention is to provide a business method of providing trade and data and analyzing suggestion to product and service platform, characterized in including following steps:

a step of providing a vending machine, wherein a vending machine selling at least a product is provided, the vending machine has a storage space allowing the product to be stored, at least one buyer selects the desired product and places an order, and a cash flow for a payment is processed via the vending machine, and the vending machine provides a logistic flow of supplying product to the buyer;

a step of listing a supplier, wherein at least one supplier is listed and the supplier provides the buyer with a logistic flow of product preparing of the product ordered by the buyer, and the product supplied by the supplier is stored in the vending machine via a logistic flow of displaying product;

a step of establishing at least one payment mode means, wherein at least one payment mode means is established, and a cash flow of credit card service through a payment of the buyer and a payment collection provided by the vending machine is formed;

a step of establishing at least one platform, wherein a platform is established and a consulting service is provided, the platform respectively provides the at least one payment mode means for purchase payment to be paid and a cash flow of the supplier for purchase payment to be paid, the platform respectively gets feedbacks for obtaining a cash flow of service fee and a cash flow of administration fee through the supplier and the payment mode means, and the platform also provides a data flow to the supplier with a planning service of vending machine business; and a step of establishing a data analysis, wherein the data analysis is established, and a consulting is provided, the data analysis is connected to the vending machine and the payment mode means to respectively obtain a data flow of revenue data and a data flow of buyer data, and the data analysis utilizes the collected revenue data and buyer data to make a product data analysis or suggestion which is provided to the supplier;

accordingly, the buyer and the supplier are able to be both provided with a product and a purchase payment in a safe means, the supplier is able to be prevented from wasting the product and can achieve the balance of the supply and demand via the product data analysis or suggestion, so that the platform and the supplier both have benefits and share the financial gains.

Wherein, according to the present invention, the vending machine is able to provide different machine types with respect to the different product.

Wherein, according to the present invention, the payment mode means is a credit card company providing the credit card service of the payment collection or a financial third-party payment.

Wherein, according to the present invention, the platform is an EZ platform.

Comparing to prior arts, advantages achieved by the present invention are as follows. The present invention utilizes the mutually-connected steps including the step of providing at least one vending machine; the step of listing at least one supplier; the step of establishing at least one payment mode means; the step of establishing at least one platform; and the step of establishing at least one data analysis; as such, the two parties of the buyer and the supplier can both be provided with the product and the purchase payment in a safe means, the supplier can be prevented from wasting the product and can achieve the balance of the supply and demand and the financial status via the product data analysis or suggestion, so that the platform and the supplier can both have benefits and share the financial gains; the conveniences, the accuracy and the safe trading between the supplier and the buyer can be effectively increased, thus the present invention is novel and more practical in use comparing to prior arts.

BRIEF DESCRIPTION OF THE DRAWINGS

FIG. 1 is a block diagram showing the business method of providing trade and data and analyzing suggestion to product and service platform according to the present invention.

DETAILED DESCRIPTION OF THE PREFERRED EMBODIMENT

One preferred embodiment of the present invention will be described with reference to the drawings for illustrating the structural assembly, the technical means and the functions to be achieved by the present invention; and the actual ratios and the arrangement of components shall not be limited by the ratios and the arrangement of components in the provided FIGURES.

Referring to FIG. 1, which is block diagram showing the business method of providing trade and data and analyzing suggestion to product and service platform according to the present invention. According to one preferred embodiment of the present invention, a business method of providing trade and data and analyzing suggestion to product and service platform is disclosed, and characterized in that: including following steps: a step of providing at least one vending machine; a step of listing at least one supplier; a step of establishing at least one payment mode means; a step of establishing at least one platform; and a step of establishing at least one data analysis.

According to the step of providing at least one vending machine, a vending machine 11 selling at least one product 10 is provided, the vending machine 11 has a storage space allowing the product 10 to be stored, at least one buyer 12 selects the desired product 10 and places an order, and a cash flow for a payment 13 is processed via the vending machine 11, and the vending machine 11 provides a logistic flow of supplying product 14 to the buyer 12; the vending machine 11 is able to provide different machine types with respect to the different products 10.

According to the step of listing at least one supplier, at least one supplier 21 is listed and the supplier 21 provides the buyer 12 with a logistic flow of product preparing 22 of the product 10 ordered by the buyer 12, and the product 10 supplied by the supplier 21 is stored in the vending machine 11 via a logistic flow of displaying product 23.

According to the step of establishing at least one payment mode means, at least one payment mode means 31 is established, a cash flow of credit card service 32 through a payment 13 of the buyer 12 and a payment collection 30 provided by the vending machine 11 are formed, the payment mode means 31 is a credit card company providing the credit card service 32 of the payment collection 30 or a financial third-party payment, but what shall be addressed is that the scope of the present invention is not limited to the above-mentioned arrangement.

According to the step of establishing at least one platform, a platform 41 is established and a consulting service is provided; according to this embodiment, the platform 41 is an EZ platform, but what shall be addressed is that the scope of the present invention is not limited to the EZ platform, the platform 41 respectively provides the at least one payment mode means 31 for purchase payment 42 to be paid and a cash flow of the supplier 21 for purchase payment 43 to be paid, the platform 41 respectively gets feedbacks for obtaining a cash flow of service fee 44 and a cash flow of administration fee 45 through the supplier 21 and the payment mode means 31, and the platform 41 also provides a data flow to the supplier 21 with a planning service of vending machine business 46.

According to the step of establishing at least one data analysis, a data analysis 51 is established, and a consulting is provided, the data analysis 51 is connected to the vending machine 11 and the payment mode means 31 to respectively obtain a data flow of revenue data 52 and a data flow of buyer data 53, the data analysis 51 utilizes the collected revenue data 52 and buyer data 53 to make a product data analysis or suggestion 54 which is provided to the supplier 21; the revenue data 52 provided by the vending machine 11 to the data analysis 51 and the buyer data 53 provided by the payment mode mean 31 can be utilized to obtain different information for example the types, the occupations, the ages of the buyer 12 and the provided product 10, so that the time having less consumption according to the information and the affections caused by weather can be used for adjustments so as to increase the revenue, the supplier 21 is able to provide a best pricing time to the buyer 12 which can be set in any time, thus the buyer 12 can be provided with the information of when is the time to buy the product 10 with a lowest price, the buyer 12 can also be provided with the information of when is the time to buy the product 10 which is desired to be bought with less people so as to avoid a situation of being in a queue, the supplier 21 can be provided with the product data analysis or suggestion 54 supplied by the data analysis 51 to analyze the future weather, the festival or holidays, the seasons for deciding when to increase and when to decrease in terms of supplying the product 10; accordingly, the material and the product 10 can be prevented from being overly stocked or being expired so as to avoid unnecessary wastes, thereby an objective of effectively balancing the supply and demand and the financial status; and the two parties of the buyer 12 and the supplier 21 can both be provided with the product 10 and the purchase payment 43 in a safe means, the supplier 21 can be prevented from wasting the product 10 and can achieve the balance of the supply and demand via the product data analysis or suggestion 54, so that the platform 41 and the supplier 21 can both have benefits and share the financial gains.

Accordingly, the present invention utilizes the mutually-connected steps including the step of providing at least one vending machine; the step of listing at least one supplier; the step of establishing at least one payment mode means; the step of establishing at least one platform; and the step of establishing at least one data analysis; as such, the two parties of the buyer 12 and the supplier 21 can both be provided with the product 10 and the purchase payment 43 in a safe means, the supplier 21 can be prevented from wasting the product 10 and can achieve the balance of the supply and demand via the product data analysis or suggestion 54, so that the platform 41 and the supplier 21 can both have benefits and share the financial gains; the conveniences, the accuracy and the safe trading between the supplier 21 and the buyer 12 can be effectively increased, thus the present invention is novel and more practical in use comparing to prior arts.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A business method of providing trade and data and analyzing suggestion to product and service platform, characterized in including following steps:

a step of providing a vending machine, wherein a vending machine selling at least a product is provided, the vending machine has a storage space allowing the product to be stored, at least one buyer selects the desired product and places an order, and a cash flow for a payment is processed via the vending machine, and the vending machine provides a logistic flow of supplying product to the buyer;

a step of listing a supplier, wherein at least one supplier is listed and the supplier provides the buyer with a logistic flow of product preparing of the product ordered by the buyer, and the product supplied by the supplier is stored in the vending machine via a logistic flow of displaying product;

a step of establishing at least one payment mode means, wherein at least one payment mode means is established, and a cash flow of credit card service through a payment of the buyer and a payment collection provided by the vending machine is formed;

a step of establishing at least one platform, wherein a platform is established and a consulting service is provided, the platform respectively provides the at least one payment mode means for purchase payment to be paid and a cash flow of the supplier for purchase payment to be paid, the platform respectively gets feedbacks for obtaining a cash flow of service fee and a cash flow of administration fee through the supplier and the payment mode means, and the platform also provides a data flow to the supplier with a planning service of vending machine business; and a step of establishing a data analysis, wherein a data analysis is established, and a consulting is provided, the data analysis is connected to the vending machine and the payment mode means to respectively obtain a data flow of revenue data and a data flow of buyer data, and the data analysis utilizes the collected revenue data and buyer data to make a product data analysis or suggestion which is provided to the supplier;

accordingly, the buyer and the supplier are able to be both provided with a product and a purchase payment in a safe means, the supplier is able to be prevented from wasting the product and can achieve the balance of the supply and demand via the product data analysis or suggestion, so that the platform and the supplier both have benefits and share the financial gains.

2. The business method of providing trade and data and analyzing suggestion to product and service platform as claimed in claim 1, wherein the vending machine is able to provide different machine types with respect to the different product.

3. The business method of providing trade and data and analyzing suggestion to product and service platform as claimed in claim 1, wherein the payment mode means is a credit card company providing the credit card service of the payment collection or a financial third-party payment.

4. The business method of providing trade and data and analyzing suggestion to product and service platform as claimed in claim 1, wherein the platform is an EZ platform.

* * * * *